United States Patent [19]
Wahren

[11] Patent Number: 5,803,236
[45] Date of Patent: Sep. 8, 1998

[54] DEVICE AT A CONVEYOR CHAIN

[76] Inventor: Mats Wahren, Huvudstagatan 4, S-592 00 Vadstena, Sweden

[21] Appl. No.: 537,664
[22] PCT Filed: May 3, 1994
[86] PCT No.: PCT/SE94/00399
    § 371 Date: Oct. 5, 1995
    § 102(e) Date: Oct. 5, 1995
[87] PCT Pub. No.: WO94/26636
    PCT Pub. Date: Nov. 24, 1994

[30] Foreign Application Priority Data

May 13, 1993 [SE] Sweden ................................. 9301664

[51] Int. Cl.$^6$ ..................................... B65G 17/38
[52] U.S. Cl. .............................................. 198/852
[58] Field of Search ............................................. 198/852

[56] References Cited

U.S. PATENT DOCUMENTS

| | | | |
|---|---|---|---|
| 2,694,611 | 11/1964 | Lorber | 198/852 X |
| 4,895,248 | 1/1990 | Wahren . | |

FOREIGN PATENT DOCUMENTS

| | | | |
|---|---|---|---|
| 934690 | 10/1973 | Canada | 198/852 |
| 2020107 | 4/1971 | Germany . | |

Primary Examiner—Donald W. Underwood
Attorney, Agent, or Firm—Merchant, Gould, Smith, Edell, Welter & Schmidt, P.A.

[57] ABSTRACT

The invention relates to an arrangement for a conveyor chain with identical links (A, B. C). These are mutually operatively connected in such a way that two links (A, B; B, C) arranged adjacent to one another are capable of pivoting relative to one another about two mutually orthogonal axes, of which a first axis is perpendicular to the upper surface (1) of the link. The chain is able in this way both to run over a guide pulley and to follow a curved path. In order to permit flexibility in the curved path, gaps (6) are present between the links (A, B, C), the width of which gaps increases up to a certain limit on the convex side of the curved path, and decreases on the concave side as the radius of curvature of the chain path decreases. Each link (A, B, C) has a recess largely parallel with the upper surface (1) and essentially in the form of a slot. Arranged so as to run in which recess is at least one essentially disc-shaped element (8; 8a, 8b), the purpose of which is to cover the aforementioned gaps (6). As relative rotation occurs between two links (A,B; B,C) arranged next to one another, the increased width of the gap occasioned by the relative rotation is covered through an operative connection with one of the aforementioned links (A, B; B, C), and mutual rotation is permitted between the links.

3 Claims, 4 Drawing Sheets

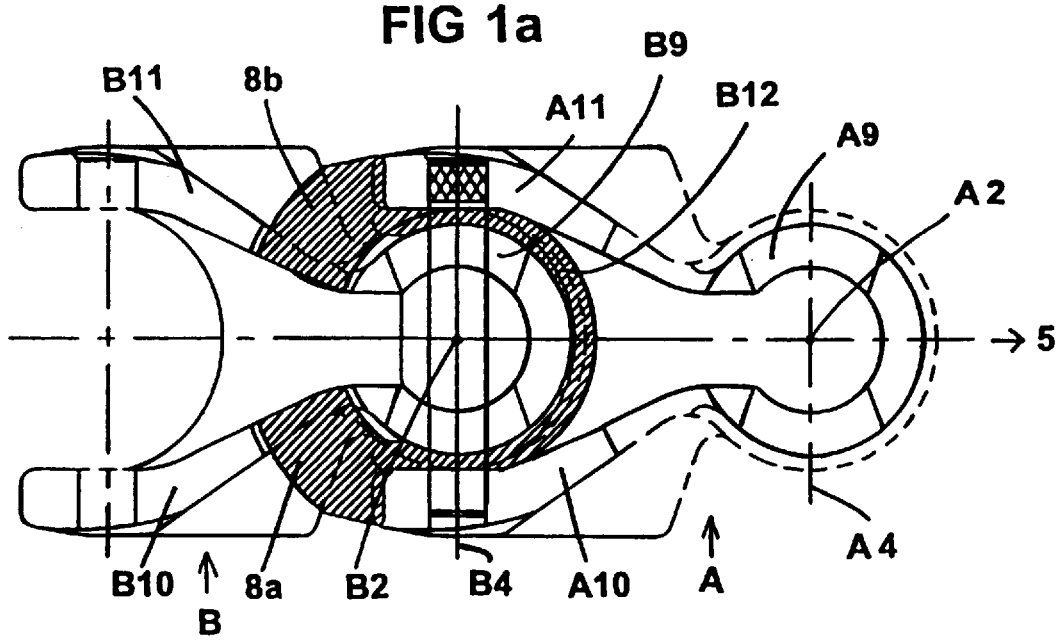
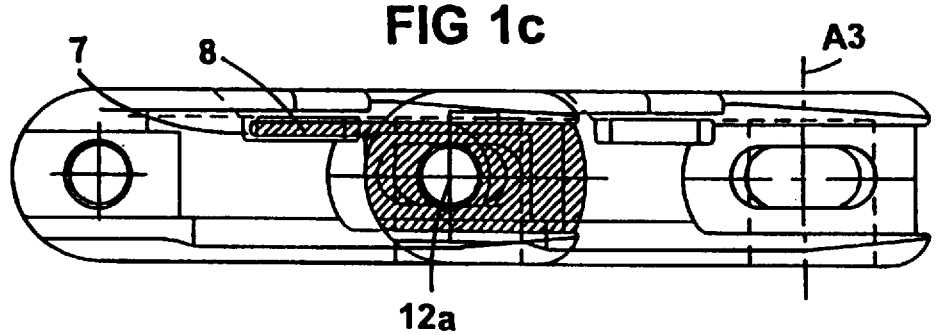
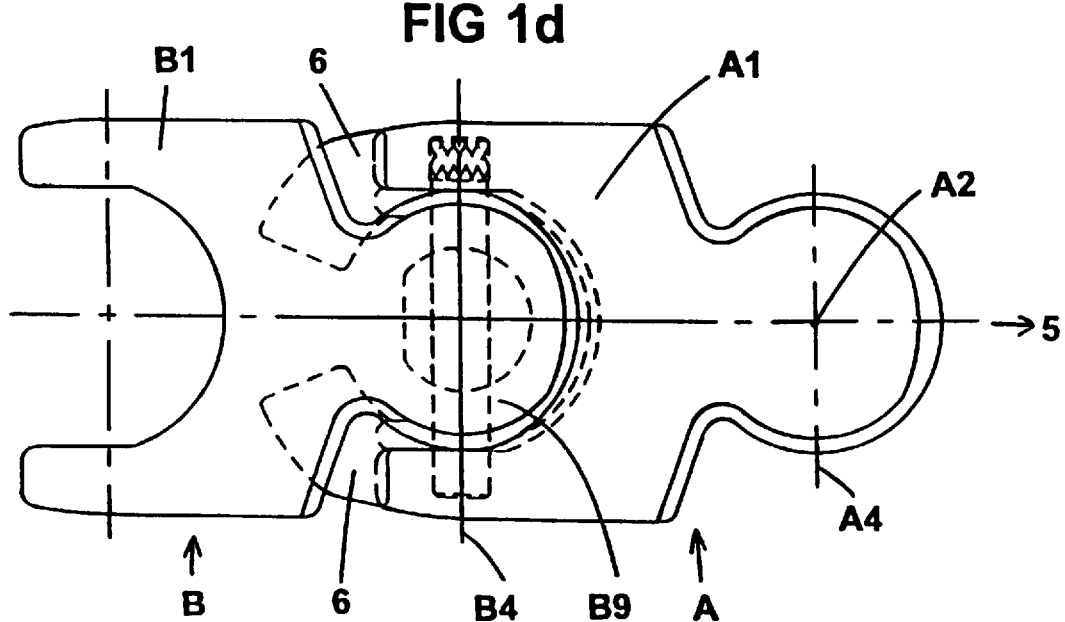

DEVICE AT A CONVEYOR CHAIN

FIELD OF THE INVENTION

The present invention relates to an arrangement for a conveyor chain with identical links, which have an upper surface and are mutually operatively connected in such a way that two links arranged adjacent to one another are capable of pivoting relative to one another about two mutually orthogonal axes, of which a first axis is perpendicular to the aforementioned upper surface, i.e. so that the chain can both run over a guide pulley and follow a curved path, in conjunction with which, in order to permit flexibility in the curved path, gaps are present between the links, the width of which gaps increases up to a certain limit on the convex side of the curved path, and decreases on the concave side as the radius of curvature of the chain path decreases, in conjunction with which each link has a recess largely parallel with the aforementioned plane and essentially in the form of a slot, arranged so as to run in which recess is at least one essentially disc-shaped element, which is so arranged as to cover the aforementioned gaps.

BACKGROUND OF THE INVENTION

Such conveyor chains are commonly encountered in industry, for example in the foodstuffs and mechanical engineering industries. Not least in the automotive industry and amongst its supplying subcontractors, conveyor chains are used in combination with so-called pallets for the automatically controlled transport and intermediate storage of components during machining or assembly.

One disadvantage of previously disclosed conveyor chains is the presence of gaps between the individual chain links. When a chain runs along a path which is curved in the horizontal plane, for instance, i.e. when the chain is subject to lateral bending, the width of the gaps on the convex side of the curve will increase as the radius of curvature reduces. This means that if one's finger, for instance, inadvertently becomes trapped in such a gap, there is a risk of crushing injury as the radius of curvature increases along the path of the chain.

A further disadvantage can be appreciated from the following. Problems arise in conjunction with assembly operations in the form of small components which fall down into the gaps in the conveyor during the assembly process, which can cause the chain to become jammed under certain circumstances and the plant to stop temporarily. The chain may rupture in the worst case. Screws, special nuts and springs, etc., which have one part smaller than the gap and the other end larger than the gap, will fall half-way down into the gap and become trapped there. Irrespective of how large or small the gap is, there will always be a particular size of screw, for example, that will become trapped.

In the area of production/machining, in particular the swarf from rotary cutting operations can give rise to problems similar to the above.

A number of other problems can occur in the packaging industry. Glass materials can break, causing glass splinters to become trapped. Certain forms of pack have loose external packaging, for example bags, the corners of which are not totally controllable. The corners in this case can find their way down into the gap, where they become trapped as the gap reduces in size on the inner radius of the curve, the consequence of which can be for the corner to be worn away when the pack remains stationary and skids on the chain.

SUMMARY OF THE INVENTION

The object of the present invention is to make available an arrangement for a conveyor chain which eliminates the aforementioned disadvantages. This is achieved in accordance with the invention in that the aforementioned disc-shaped element is so arranged that, as relative rotation occurs between two links positioned next to one another, the increased width of the gap occasioned by the relative rotation is covered by means of an operative connection with one of the aforementioned links, permitting mutual rotation to take place between the links.

In one embodiment of the invention, in which each link has an essentially cylindrical frame part lying coaxially with the aforementioned first axis and two shanks projecting from it, which shanks subtend an angle with one another and with their outer free ends and are in articulated contact with the frame part of the next link by means of the second axis, in conjunction with which a partially cylindrical slotted sleeve acting in the frame part of one link and the following link as a spacer element between the ends of the shanks is arranged with sliding contact around the frame part in order to accompany the rotation of the second axis around the first axis, the aforementioned disc-shaped elements are divided up in accordance with another particular characteristic of the invention into two sub-elements, which are attached to the sleeve, more specifically with one sub-element on either side of the slotted opening in the sleeve, which sub-elements are so arranged as to run in the aforementioned recesses and to permit relative rotation between the links around the axes.

A further special characteristic of the invention in the embodiment outlined above is that the disc-shaped element is essentially semi-circular in form and has a recess on its part facing towards the centre of the circle, in which recess there engages a projection which is attached to the next link, the purpose of which is, on the one hand, to prevent the element from falling out of the slotted openings in the shanks and, on the other hand, to cause the element to rotate so that the gaps between the links are covered.

BRIEF DESCRIPTION OF THE DRAWINGS

The invention is described below in greater detail with reference to the accompanying drawing, in which FIGS. 1*a*, 1*b* illustrate schematically in a plan view from above a preferred embodiment of an arrangement in accordance with the invention for a conveyor chain, of which two and three links respectively are shown, which links are arranged directly in line and at an angle relative to one another.

FIG. 1*c* shows the links in FIG. 1*a* in side view, and

FIG. 1*d* shows the links in FIG. 1*a* from the opposite side.

DESCRIPTION OF THE PREFERRED EMBODIMENT

Figure 1B:
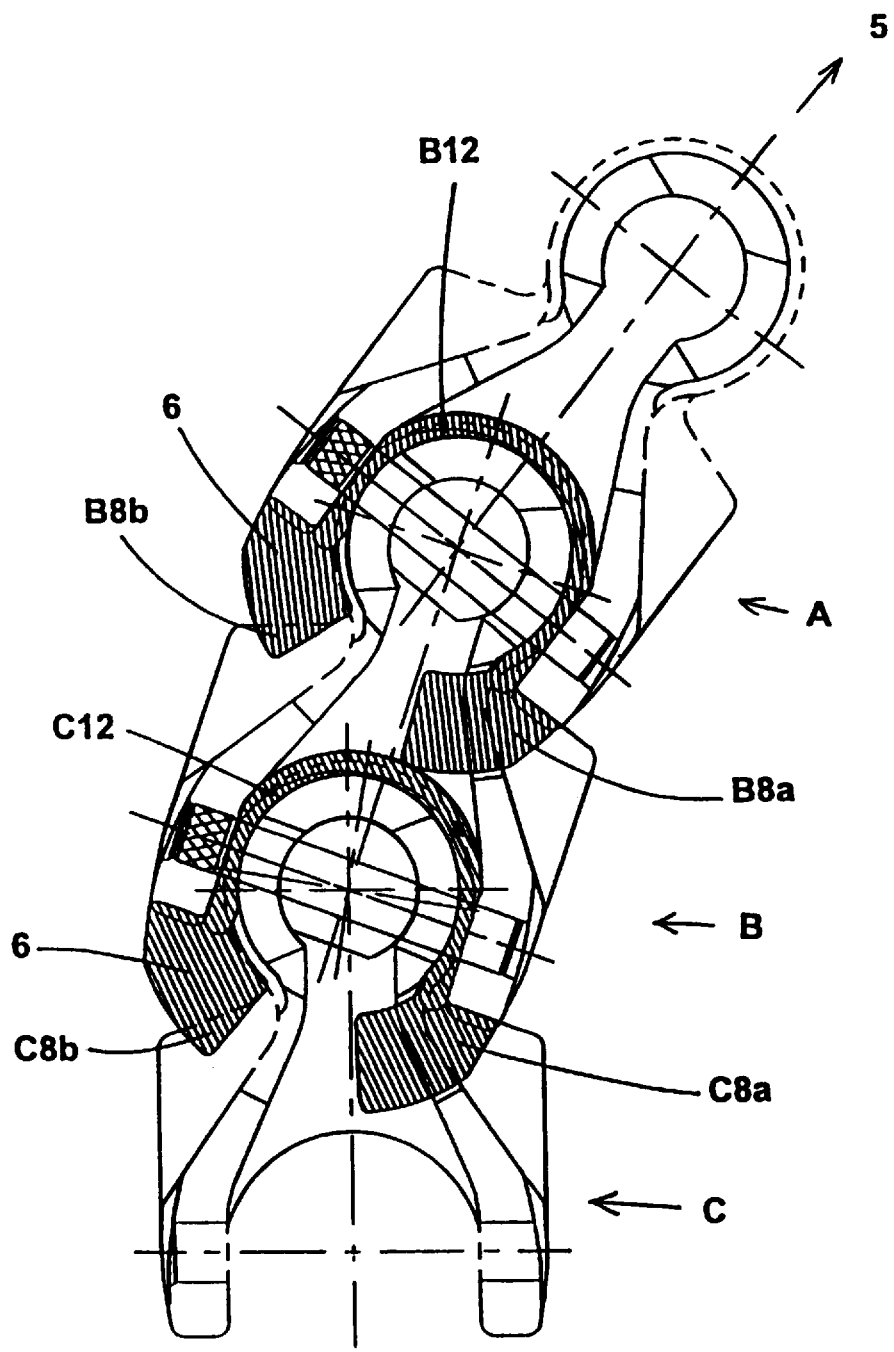
Figure 2A:
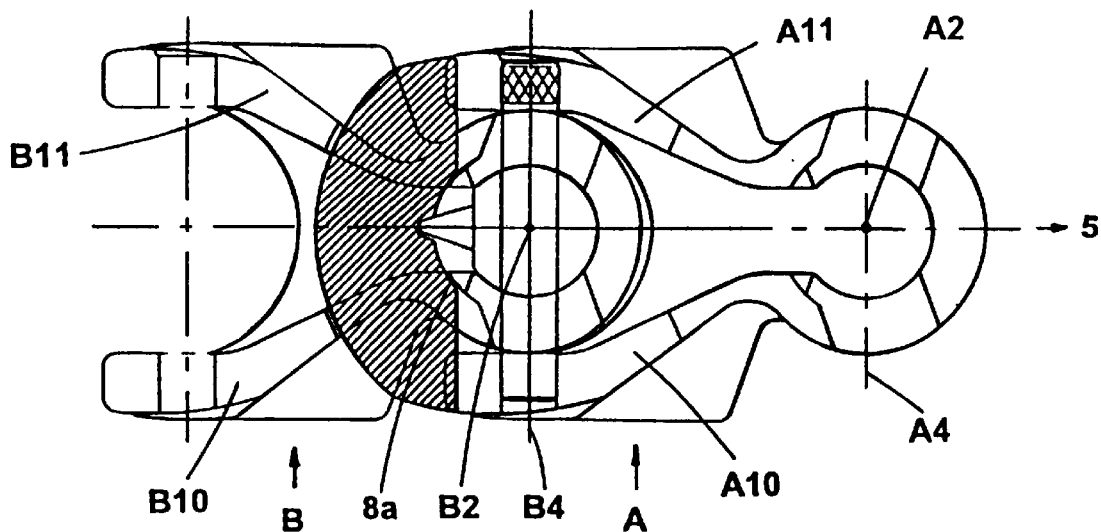
FIGS. 2*a*, 2*b*, 2*c* and 2*d* illustrate an alternative embodiment of the invention, in a corresponding manner to FIGS. 1*a*, 1*b*, 1*c* and 1*d*.
Figure 2C:
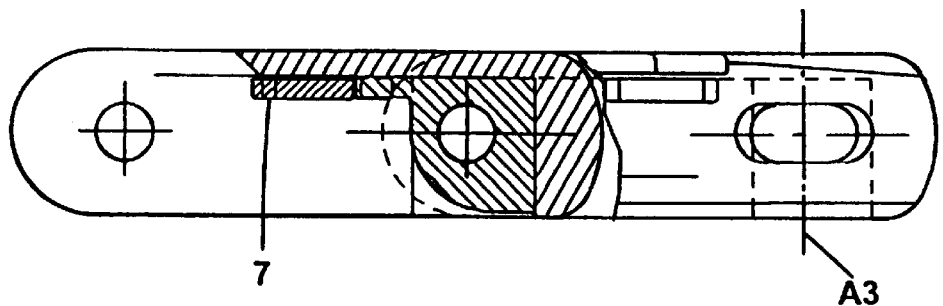
Figure 2D:
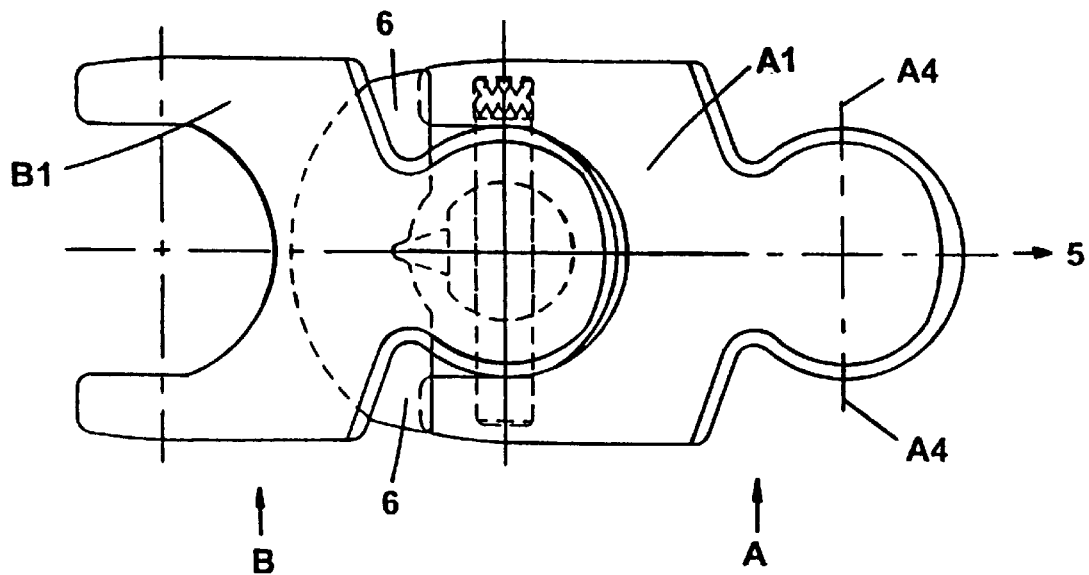
Figure 2B:
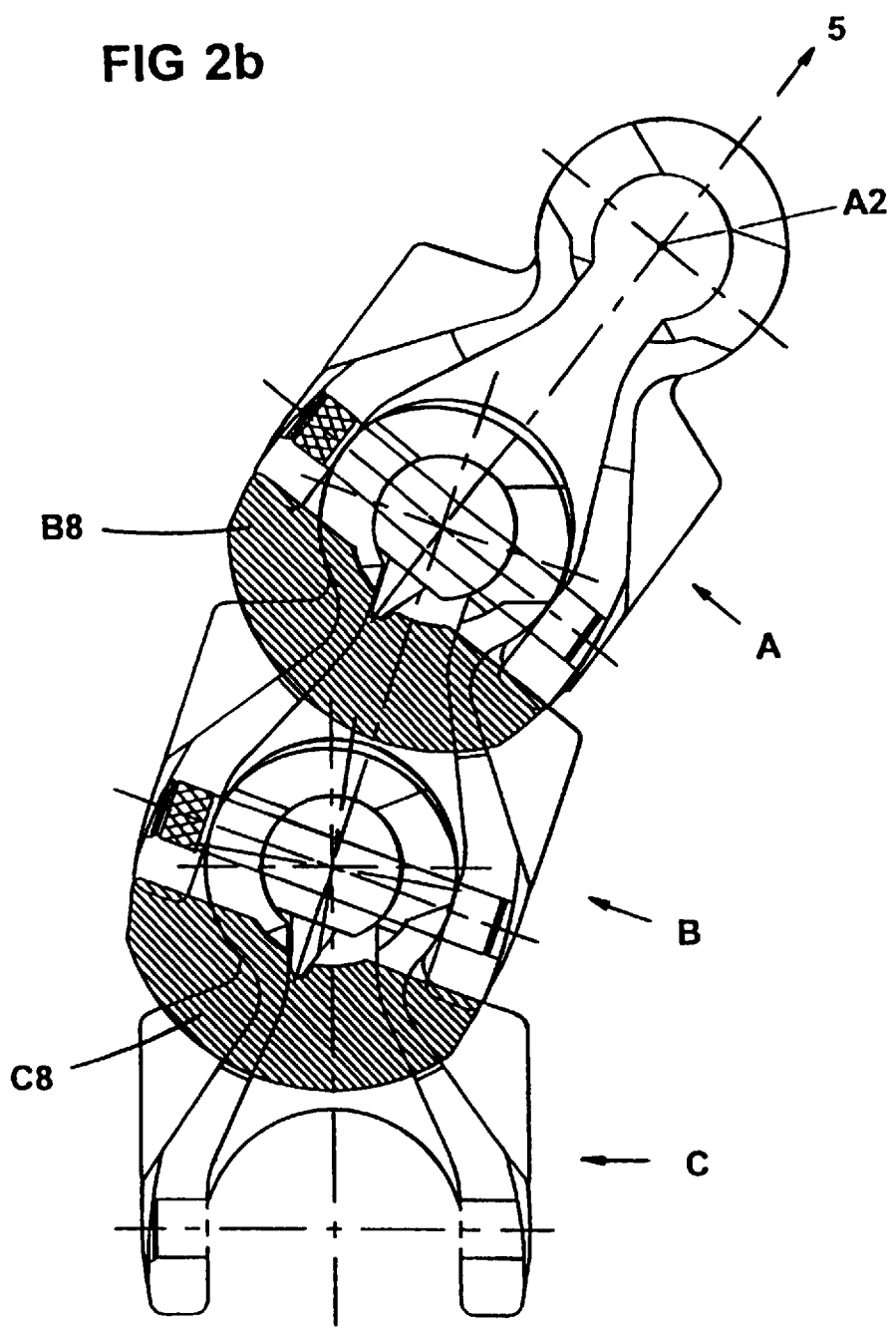

A, B and C are used in the drawing to designate identical links in a conveyor chain. Each link has an upper surface 1, which may be entirely smooth, rough or provided with transverse or longitudinal ribs, and an under surface, which are parallel with the plane of the paper in FIGS. 1*a*, 1*b*, 1*d* and 2*a*, 2*b*, 2*d*. The links A, B and C are mutually operatively connected in such a way that two consecutive links are capable of pivoting relative to one another about two mutually orthogonal axes.

A point 2 in the drawing marks the intersection between a first axis 3 and the upper surface 1 of the link, and the designation 4 is used in respect of an axis perpendicular to the axis 3. An arrow 5 indicates the normal direction of movement of the chain. The chain may exhibit the opposite direction of movement, however, and its under surface may also serve as the upper surface.

The aforementioned mutual ability to pivot between the links A, B, C affords the possibility of causing the chain to run over a guide pulley. The guide pulley may thus be in engagement with the upper surface 1 of the chain or with its opposite surface, i.e. the chain can be deflected upwards or downwards. It is possible, furthermore, to cause the chain to follow a curved path with the upper surfaces 1 of the links in a common plane, or to cause the chain to follow a path such that simultaneous relative rotation is required about both axes 3 and 4. Present between the links are gaps 6, which can be most clearly appreciated from FIGS. 1d and 2d, which gaps are necessary to permit the chain, at a certain radius of curvature, to follow a curved path as described above.

An attempt has been made to eliminate the aforementioned disadvantages by providing the links with fin-like projections which cover the gaps, although these projections have been found to impose serious restrictions on the mutual ability of the links to pivot about the aforementioned axis 4, and have thus provided an impaired opportunity to route the chain over a guide pulley with a relatively small radius.

In order to be able, without restricting the mutual ability of the links to pivot, to cover the gaps 6 between the links A, B, C, a disc-shaped element 8 has been arranged in accordance with the invention, and as mentioned by way of introduction, in a recess 7 running essentially parallel with the upper surface 1, which disc-shaped element is so arranged as to cover the gaps 6 between two links A, B; B, C arranged adjacent to one another, including when the width of the gaps increases due to the relative rotation between the links A, B and C.

Although the invention is described in greater detail below with reference to a preferred embodiment illustrated in FIG. 1 and an alternative embodiment illustrated in FIG. 2, it is obvious that the invention may not be regarded as being restricted to these embodiments, but may be modified in many ways within the scope of the idea of invention.

In the embodiments illustrated in the drawing, each link exhibits a frame part 9 arranged coaxially with the axis 3 and two shanks 10, 11 projecting from it. The frame part 9 is essentially cylindrical, and the shanks 10, 11 subtend an angle with one another such that they partially enclose the frame part 9 of the next link, so that they are in articulated contact with the aforementioned frame part 9 with their outer ends with the help of the axis 4. In other words it is true to state, with reference to FIGS. 1a, 2a, that the frame part A9 of the link A is in articulated contact with the shanks B10, B11 of the link B through the axis 4.

The preferred embodiment in accordance with FIG. 1 shows a spacer element 12 in the form of a partially cylindrical slotted sleeve, which is arranged in sliding contact around its associated frame part, for example B9, and partially encloses it and is arranged between the ends of the shanks A10, A11 and the frame part B9. The axis 4 passes through openings 12a in the spacer element 12, so that it follows the relative rotation of the immediately following link; in other words, the spacer element 12 is operatively connected via the axis 4 to the shanks A10, A11.

The disc-shaped element in accordance with the invention is divided up in this embodiment into two sub-elements 8a, 8b, which are attached to the sleeve 12, more specifically with one sub-element on either side of the slotted opening in the sleeve 12 and in one piece with the sleeve 12. As already mentioned, the sub-elements 8a, 8b run in the recesses 7 arranged in the shanks 10, 11. The recesses 7 are of essentially slotted form and lie parallel with the upper surface 1 of the link. With reference to FIG. 1b, sub-elements B8a, B8b belong to the sleeve B12, and sub-elements C8a, C8b belong to the sleeve C12. The sub-elements 8a, 8b are so arranged as to run in the recesses 7 in the shanks 10 and 11, and effectively cover the gaps 6 between the links A, B and C, irrespective of the relative rotation of the links about the axis 3.

Relative rotation between the links A, B and C about the axis 4 is also not prevented by the sub-elements 8a, 8b, since these accompany the rotation of the shanks about said axis. The gaps 6 are most clearly visible in FIGS. 1d, 2d, although it is also possible to note from FIGS. 1b, 2b how the width of the gap is increased and reduced respectively on the convex and concave sides of the curved chain.

The embodiment of a conveyor chain shown in FIG. 2 does not contain any sleeve-shaped spacer element between the frame part 9 of a link A, B, C and the shanks 10, 11 of a following link. In a similar fashion to the previous embodiment, there is present a disc-shaped element 8, which is so arranged as to run in a slot-shaped recess 7 in the shanks belonging to a link and is so arranged as to be in engagement with a part of the following link. In the embodiment shown in FIG. 2, the element 8 is essentially semi-circular in form and has a recess 8c on its part facing towards the centre of the circle, in which recess there engages a projection 13. This is attached to the next link, in the example shown here with the axis 3 of the next link, and its purpose is, on the one hand, to prevent the element 8 from falling out of the slotted openings 7 in the shanks 10, 11 and, on the other hand, to cause the element 8 to rotate so that the gaps 6 between the links are always optimally covered.

I claim:

1. A conveyor chain arrangement, comprising:
    a plurality of adjacent, identical links each of which has an upper surface, each said link being articulated to an adjacent said link whereby said links are pivotable relative to one another about two mutually orthogonal axes, one of said axes being perpendicular to said upper surface, and including gaps formed between each pair of adjacent said links;
    each said link including a recess therein extending parallel to the upper surface thereof; and
    at least one element disposed within each said recess of each said link and covering at least one of said gaps, said at least one element being connected to an adjacent said link so as to be movable therewith whereby when said adjacent link pivots about said one axis, the at least one element remains in a covering position over said one gap.

2. The conveyor chain arrangement according to claim 1, wherein each said link includes a generally cylindrical frame part coaxial with said one axis, and two shanks extending from said cylindrical frame part to free ends thereof, said shanks diverging from each other, and said free ends of said shanks of one said link being articulated to the cylindrical frame part of an adjacent said link whereby said one link is pivotable relative to said adjacent link about said two mutually orthogonal axes; further including a partially cylindrical, slotted sleeve disposed between the cylindrical frame part and the free ends of the shanks, said partially cylindrical, slotted sleeve being slideable around the cylindrical frame part and moveable with the free ends of the shanks about said one axis; and further comprising a plurality of said elements, said elements being connected to said partially cylindrical, slotted sleeve on either side of a slot therein, said elements being disposed within a respective one of said recesses.

3. The conveyor chain arrangement according to claim 1, wherein each said link includes a generally cylindrical frame part coaxial with said one axis, and two shanks extending from said cylindrical frame part to free ends thereof, said shanks diverging from each other, and said free ends of said shanks of one said link being articulated to the cylindrical frame part of an adjacent said link whereby said one link is pivotable relative to said adjacent link about said two mutually orthogonal axes; wherein the element is a semicircular, disc-shaped element having a recess therein facing toward said cylindrical frame part; and further including a projection attached to and moving with an adjacent said link, said projection being disposed within said recess in the disc-shaped element.

\* \* \* \* \*